United States Patent [19]

Douglas

[11] Patent Number: 5,156,049

[45] Date of Patent: Oct. 20, 1992

[54] MANUAL INPUT SYSTEM FOR AUTOMOTIVE TEST EQUIPMENT

[75] Inventor: Michael W. Douglas, St. Peters, Mo.

[73] Assignee: Hunter Engineering Company, Bridgeton, Mich.

[21] Appl. No.: 817,310

[22] Filed: Jan. 6, 1992

Related U.S. Application Data

[62] Division of Ser. No. 665,674, Mar. 7, 1991.

[51] Int. Cl.$^5$ ............................................. G01M 1/22
[52] U.S. Cl. ..................................... 73/462; 340/706
[58] Field of Search ..................... 73/121–129, 73/116, 462, 117.2; 340/706, 722; 455/158; 74/10.5; 116/205, DIG. 17; 335/114, 98, 135; 301/5 A, 5 BA

[56] References Cited

U.S. PATENT DOCUMENTS

| | | | |
|---|---|---|---|
| 4,065,720 | 12/1977 | Pogue, Jr. | 455/158 |
| 4,091,234 | 5/1978 | Bristow | 338/114 |
| 4,267,730 | 5/1981 | Curchod et al. | 73/462 |
| 4,318,095 | 5/1982 | Fukuoka | 340/706 |
| 4,322,983 | 4/1982 | Sado | 338/114 |
| 4,695,711 | 9/1987 | McGeorge | 340/706 |
| 4,897,629 | 1/1990 | Lecklider | 338/114 |
| 4,933,660 | 6/1990 | Wynne, Jr. | 338/114 |
| 5,036,306 | 7/1991 | Bergkuist | 338/114 |

Primary Examiner—John E. Chapman
Assistant Examiner—Howard Wisnia
Attorney, Agent, or Firm—Polster, Lieder, Woodruff & Lucchesi

[57] ABSTRACT

A manual parameter input system for automotive test equipment such as a vehicle wheel balancer. Variable pressure input knobs supply rotation direction and "applied pressure" information to the balancer's internal computer. The computer updates the value displayed by digital visual displays at a rate corresponding to the applied pressure to the knob. The visual display output is independent of the actual rotational position of the input knobs, and hence is highly tolerant of mechanical slippage and other mechanical deficiencies in the input system.

16 Claims, 4 Drawing Sheets

MANUAL INPUT SYSTEM FOR AUTOMOTIVE TEST EQUIPMENT

This is a divisional of copending application Ser. No. 665,674, filed on Mar. 7, 1991.

BACKGROUND OF THE INVENTION

1) Field of the Invention

The present invention relates to automotive test equipment such as a machine for balancing motor vehicle wheels of different sizes and types, and in particular to a system for inputting wheel information concerning the particular wheel under test so that the wheel balancer may determine the required imbalance correction weight and point of placement on the wheel/tire assembly.

2) Discussion of Prior Art

It is well known in the wheel balancing art that certain parameters of the tire/wheel combination must be fed into the machine before it can determine the magnitude and angle of imbalance for a given correction weight plane (usually the lip of the wheel). These inputs typically involve rim diameter, rim width, and some reference distance of the rim to the balancer.

Although automatic data entry systems exist for this function (see U.S. Pat. No. 4,341,119 to Jackson et al, U.S. Pat. No. 4,576,044 to Boni, and U.S. Pat. No. 3,741,016 to Hofmann), all known wheel balancing machines have a manual method for feeding in these parameters (either standing alone or in addition to the automatic system). Such a manual system is required in the event of automatic data entry system failure. Moreover, lower priced balancers are sold with only manual input systems because of the expense of automatic systems.

The manual systems on known machines include either potentiometers (pots), keypad(s), or a simple up/down membrane switch for parameter entry. Each type of manual entry system has its own advantages.

The exclusive use of pots (illustrated by wheel balancers sold by Hunter Engineering Company under the trade designations S700 and S800) offers the user instant visual access to the dialed-in parameter without the need for an electronic display for that parameter. In these machines, the range of possible values is simply provided by an artwork scale on the front panel of the balancer. Dialing a pot is faster than punching a series of keys for each value. In addition, hands dirtied from handling tires soil the knob, not the artwork (as with a keypad).

Since the knob of the potentiometer is a strictly mechanical device, static discharge from the user to the knob does not damage the balancer electronics. Contrast that with keypads. The keypad is a natural path for human static discharge damage to electronics, thus requiring additional printed circuit (pc) board real estate and the attendant costs of protective devices.

Finally, the feel of a knob is desirable over a keypad or a simple up/down membrane switch, especially over inexpensive membrane-type keypads found on wheel balancers. These keys must endure constant use, and reliability is questionable for this application. (For comparison, rotary knobs are the norm on high-end audio equipment of any perceived quality.)

On the other hand, the exclusive use of keypad(s) (illustrated by U.S. Pat. No. 4,502,328 to Wood et al.) offers the user unambiguous data input because no analog to digital conversion takes place (as does occur with the use of pots). The user does not have to interpolate between two marks on panel artwork when confronted with non-standard values such as 5.6 inches for wheel width—a keypad can enter 5.6 exactly. A keypad does not experience humidity, age drift, component tolerance, or linearity problems as can pots.

Pots also require the user to physically move the dial out of the range of panel artwork scale values, typically to an "external" position, when it is desired to input parameters via an automatic entry device, such as those described above. If this is not done, the dial could erroneously be pointing to a front panel artwork value while the machine would actually be using a different value obtained from the automatic system. Keypads eliminate this problem since there is no artwork scale involved.

The keypad offers the assembly advantage of "plug in and go," whereas a pot requires careful alignment to panel artwork to work in its proper rotary range. (The pot also must never move from its originally installed position.) Finally, the keypad input value is displayed electronically (usually on an LED display), which is easier to read than a pointer of a pot knob against an artwork scale printed on a panel (especially at any distance over two feet).

SUMMARY OF THE INVENTION

Among the various objects and features of the present invention is the provision of automotive test equipment having a manual input system with improved reliability at less cost.

A second object is the provision of such a system which is easier for the user to use.

A third object is the provision of such a system using digital quadrature rotary encoders, offering the advantages of both pot and keypad systems while at the same time not having the disadvantages of either.

A fourth object is the provision of new advantages in input usability via the flexibility of software.

A fifth object is the provision of such a system which is extremely tolerant of mechanical deficiencies associated with the input device.

A sixth object is the provision of such a system which provides relatively instantaneous feedback to the user to rapidly obtain the desired parameter input value.

Other objects and features will be in part apparent and in part pointed out hereinafter.

Briefly, an automotive test equipment parameter input system of the present invention includes a display for visually displaying a potential value of a parameter for the automotive test equipment. Manually operable rotary input devices are operable by a user for providing, by rotation of the input devices, an indication that a change in the displayed value is desired by the user. Electronics, connected to the display and responsive to the indication from the input devices that a change is desired, control the display to change the potential value of the parameter displayed by the display in accordance with the rotation of the rotary input devices.

In a second aspect of the automotive test equipment parameter input system of the present invention, a display is provided for visually displaying a potential value of a parameter for the automotive test equipment. Manually operable rotary input devices are operable by a user to provide, by rotation of the input devices, an indication that a change in the displayed value is desired by the user. Electronics, connected to the display and responsive only to rotation of the rotary input devices, change the potential value of the parameter displayed by the display, the response of the electronics being independent of the actual rotational position of the rotary input devices.

An automotive test equipment input system of the present invention includes a display for visually displaying a potential value of an input to the automotive test equipment. Manually operable input devices are operable by a user applying variable pressure thereto to provide a variable signal indicating that a change in the displayed value is desired by the user. The variable signal varies in accordance with the amount of variable pressure applied by the user. Electronics, connected to the display means and responsive to the variable signal from the manually operable input devices, control the display to change the potential value of the input displayed by the display means at a rate corresponding to the variable pressure applied by the user to the manually operable input devices.

BRIEF DESCRIPTION OF THE DRAWINGS

Similar reference characters indicate similar parts throughout the several views of the drawings.

DESCRIPTION OF THE PREFERRED EMBODIMENT

Figure 1:
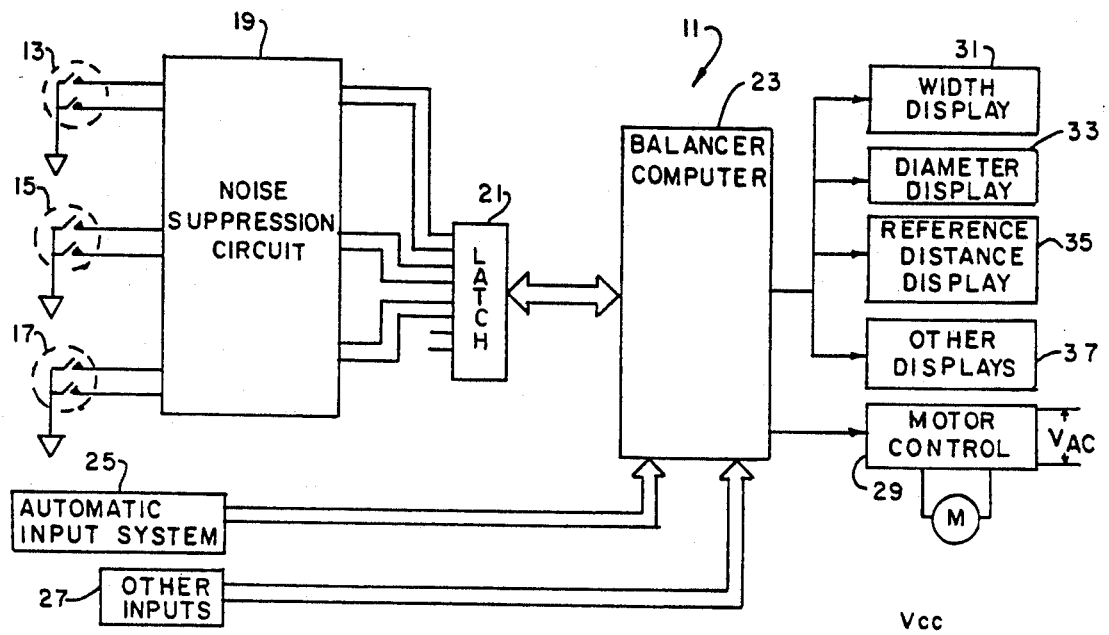
FIG. 1 is a schematic block diagram of a wheel balancer, showing in particular the unique manual input system of the present invention.

Turning to the drawings, automotive test equipment, namely a wheel balancer 11, includes three low-cost manual input devices 13, 15, and 17 connected through noise suppression circuitry 19 and a latch 21 to the computer 23 of balancer 11. An automatic input system 25 and a block 27 labelled "Other Inputs" (i.e., mode selection switches, vibration sensors, and the like) also supply inputs to balancer computer 23. The "Other Inputs" put the machine into the desired mode of operation. Illustrative modes of operation of the wheel balancer are inches/mm wheel parameter selection, oz/-grams selection, dynamic/static balance selection, start spin cycle, etc. The computer is used in the conventional manner to determine from its various inputs the required placement of weights to balance a wheel/tire assembly.

In addition to the inputs shown, computer 23 includes several outputs including a motor control 29 for controlling the application of power to a motor M. As is well known, motor M is used to rotate the wheel/tire assembly under test so as to obtain the vibrational characteristics of the assembly.

Figure 2:
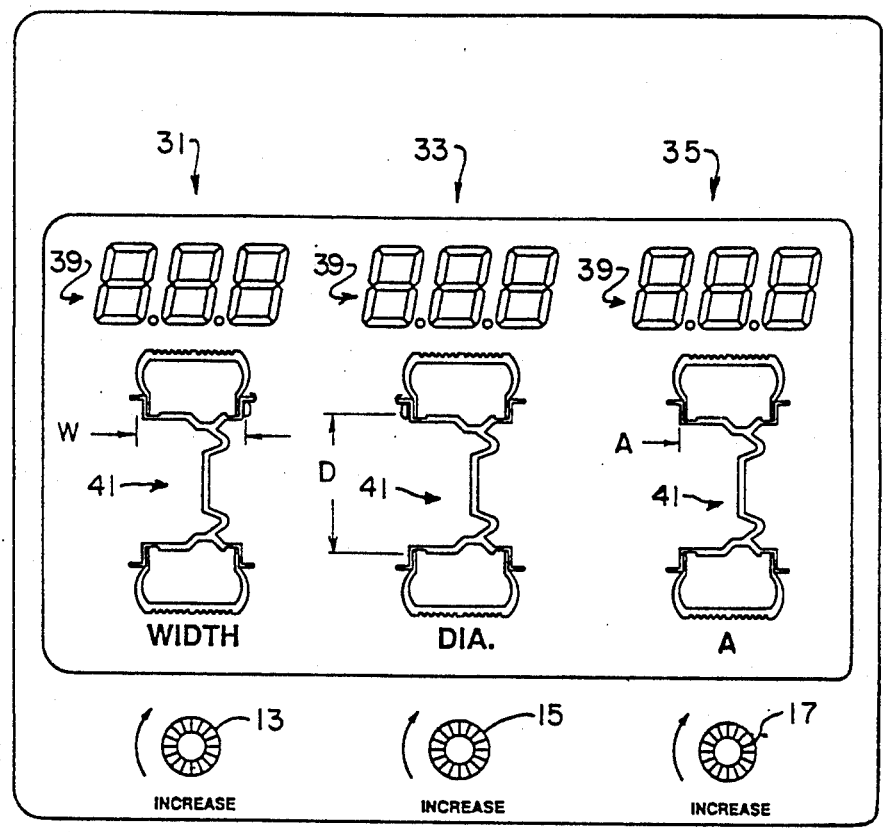
FIG. 2 is a front elevation of the display panel/manual input portion of the balancer of FIG. 1.

The balancer computer also drives a number of displays, which form part of the present invention. Specifically, computer 23 drives a width display 31, a diameter display 33, a reference distance display 35, and various other displays 37, as desired. The parameter input displays are shown in more detail in FIG. 2.

Each display 31, 33, 35 includes a three-digit, seven segment display 39, controlled in the conventional manner by balancer computer 23, and a graphical representation 41 of a wheel/tire assembly. These graphical representations each include unique indicia which readily indicate to the user the identity of the particular display. For example, the width display representation has a pair of arrows defining the wheel width and showing the location at which the width should be measured. It also has the legend "WIDTH" at the bottom. Similarly, diameter display 33 has a pair of arrows defining the wheel diameter (which show where the wheel diameter should be measured) and the legend "DIA." at the bottom. The third display, reference distance display 35, has a single letter 37 A" at the bottom and an arrow pointing to the place where the reference distance is to be measured. The reference distance "A," as is known in the art, is the distance from one of the wheel rims to a reference point on the balancer. Thus, the graphical representations clearly indicate to the user the place to take the measurement and identify the particular parameter being displayed in the corresponding seven segment display 39.

Immediately below the respective displays are the knobs of corresponding manual input devices 13, 15 and 17. It is thus readily apparent to the user that input knob 13 is used to input the width parameter, knob 15 is used to input the wheel diameter parameter, and knob 17 is used to input the reference distance parameter. Each knob has associated therewith indicia indicating the proper direction of rotation for increasing the corresponding parameter. Of course, decreasing the parameter is accomplished by rotating the corresponding knob in the opposite direction. As will become apparent, balancer computer 23 causes each seven segment display to visually display a potential parameter value. If the user wants to change that value, he simply rotates the corresponding knob until the desired value is displayed in the corresponding display.

It is preferred that manual input devices 13, 15, and 17 be digital rotary encoders, for reasons which will become apparent. More specifically, it is preferable that the manual input devices be low cost, contacting (not optical) dual square wave quadrature output rotary encoders It has been found that the EC family of digital rotary contacting encoders sold by Bourns, Inc. of Riverside, Calif. will perform satisfactorily in the present invention. Each input encoder knob 13, 15 and 17 has a corresponding electronic display output 39 to indicate the currently recognized value of diameter "D," width "W," and reference distance "A."

Figure 1A:
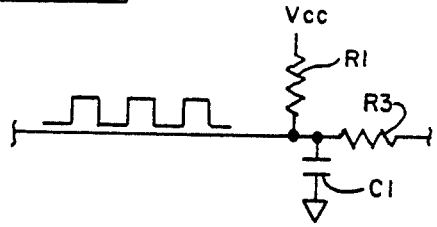
FIG. 1A is an electrical schematic of an illustrative portion of the noise suppression circuitry of FIG. 1.

The quadrature output signals from encoders 13, 15, and 17 are conditioned by low cost noise suppression circuitry 19. Typical noise suppression circuitry is shown in FIG. 1A as consisting simply of a pair of resistors R1 and R3 and a capacitor C1, connected in a standard low-pass filter configuration. Each output line from encoders 13, 15 and 17 has a similar noise suppression circuit associated therewith.

The filtered quadrature signals from the manual input encoders are sent to latch 21. The address of this latch is scanned by balancer computer 23, as are the other inputs shown on FIG. 1. Software routines determine when an encoder knob is turned, the rate of rotation, and direction. These routines are illustrated by the flowchart of FIG. 3.

Figure 3:
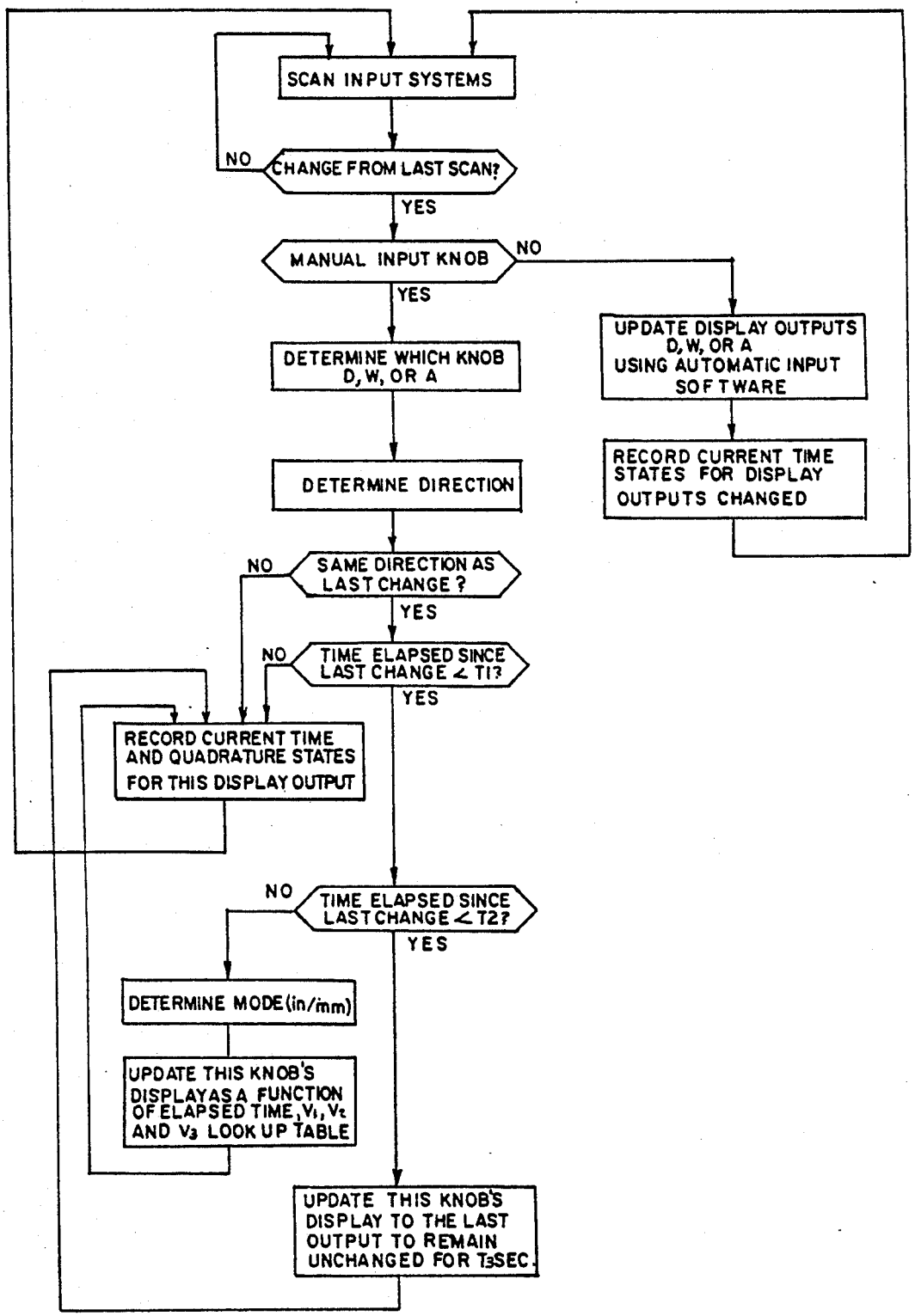
FIG. 3 is a flowchart illustrating the operation of the electronics of the present invention.

Turning to FIG. 3, the first step is to scan the input systems, such as latch 21, automatic input system 25, and other system inputs 27. If there is no change from the previous scan, balancer computer 23 simply repeats this step until there is a change. If the change does not come from a manual input knob (through latch 21), then the computer branches to automatic input software (shown as a single block in FIG. 3 since it forms no part of the present invention). If an optional automatic data input system 25 is used, displays 31, 33, and 35 are automatically updated to the new values of width "W," diameter "D," and reference distance "A" acquired by the automatic system. The computer records the time that the new values for these parameters were acquired, and returns to the first step in the routine to continue scanning.

On the other hand, if the changed input is from a manual input knob, the computer determines which knob 13, 15, or 17 has been changed and the direction of the change. It should be appreciated that with quadrature encoders, determining the direction of change is relatively straightforward. Balancer computer 23 then determines if this is the same direction as the last change for that particular knob. If it is not, that is, if the knob is being rotated in the opposite direction from that previously measured, the computer records the time and the quadrature states for that particular knob and returns to the scanning step.

If, however, the change is in the same direction as the previous change for that particular knob, the computer runs a series of time checks on the input to see if it qualifies as a valid request for a change in the displayed parameter. First, the computer checks to see if the time which has elapsed since the last change for that knob is less than some predetermined value T1. Elapsed time T1 is the maximum allowed time between input changes to cause an output display to change. If the elapsed time it greater than T1, computer 23 does not change the display, but instead records the current time and quadrature states for this particular knob and then returns to the scanning step. The purpose of this step is to provide a programmable minimum rotation rate to cause a change in the potential value. The user can make the knob as sensitive as desired.

On the other hand, if the elapsed time since the last change is less than time T1, the computer checks to see if the elapsed time since the last change is less than a second predetermined time T2. Time T2 is a relatively short time that one would expect to see if the user were to rapidly spin the knob. Such rapid spinning causes computer 23 to clear the corresponding display and replace it with the last stable value of that particular parameter. That last stable value is defined as the last displayed value which remained unchanged for a predetermined time T3. For example, assume that T3 equals three seconds. The user starts to make a change to the displayed value of width, for example, and then realizes he has made a mistake and should be changing the displayed value of diameter. He simply rapidly spins the width knob 13 and display 31 reverts to displaying the last stable value. After resetting the display to the last stable value, the computer records the time and quadrature states, and returns to the scanning step.

In those instances where the knob is not being spun rapidly, the elapsed time is less than T2, so a change in displayed parameter value for that knob is being requested. The computer checks the mode of the system (inches or mm) and then updates the display corresponding to this knob. This updating function is not, however, simply a matter of incrementing the display a set amount for each step change in the rotary encoder output. Instead the present system is designed to change the display by larger increments when the corresponding knob is rotated rapidly and by smaller increments when the knob is rotated more slowly. This is indicated on the flowchart by the reference to V1, V2, and V3, where V1 is a default display increment value dependent on the machine mode and elapsed time since the last input change (i.e., knob rotation rate), V2 is a fine tune display increment value dependent on machine mode and elapsed time, and V3 is a multiplier of V1 or V2, dependent on elapsed time.

Figure 4A:
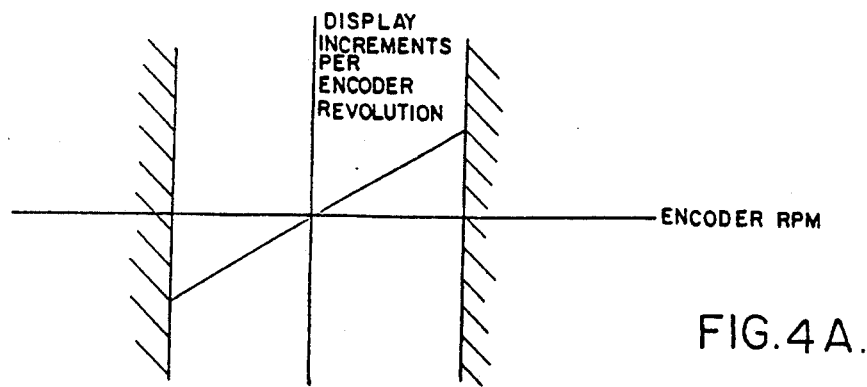
FIG. 4A is a chart showing one possible display update response as a function of knob rotation rate for the present invention.
Figure 4B:
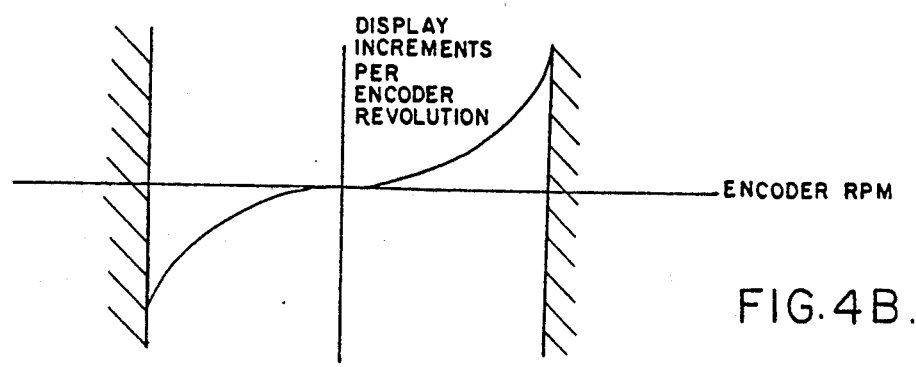
FIG. 4B is also a chart showing a second possible display update response as a function of knob rotation rate.

This feature is illustrated graphically in FIGS. 4A and 4B, which show two different responses to encoder rotation rate. In FIG. 4A, the change in increment with encoder rpm is linear. The faster the knob is rotated, the greater the increment by which the corresponding display is changed. For example, the user can rapidly change the display to the vicinity of the desired value by rapidly rotating the knob. The display might change one inch for each sixty degrees of knob rotation at high rpm, for example. Once the user reaches the vicinity of the desired parameter value, he slows down the rate of rotation and the computer in response also reduces the increment to, for example, 0.01 inch for each ten degrees of knob rotation.

This feature provides a variable "feel" to the system and allows the user to rapidly reach the vicinity of the desired value and then "fine-tune" the display as desired by slowly moving the knob. FIG. 4B shows a similar effect with a non-linear response. Note that in both charts, a knob rotation rate greater than some predetermined value results in cancelling the change and reverting to the last stable value as described above. This feature is indicated on FIGS. 4A and 4B by the crosshatching.

As can readily be seen, this approach to parameter input results in several advantages. It provides the quality feel of turning a knob, combined with the unambiguous, non-varying digital nature of a keypad. Moreover, the analog problems of temperature, humidity, age drift, and linearity associated with a pot are avoided, along with the soiling, reliability, and human static discharge problems of a keypad.

Significantly, since the encoders are used to simply increase or decrease a displayed value, there is no need to align the encoder to any particular position since there is no dead spot as with pots. In fact, the encoder can actually get bumped by handling or be shifted from its original installed position with no change in performance. Since there is no artwork for the knob to point to, the need for calibration of the dial to the artwork is eliminated. The present invention has the "plug in and go" advantage of a keypad.

Moreover, since the computer determines only changes in the knob output and not the actual rotational position of the knob, there is no need to move the dial to an "external" position for the use of an automatic data entry system. The display, for example, simply updates to the newly acquired diameter value via the automatic system without requiring any movement of the manual knob. If the user now wishes to increase the displayed diameter value manually, he simply turns the manual diameter input knob clockwise.

The present invention also increases the readability of the displays over the artwork used with pots. The entered values are shown on an illuminated display rather than as a printed artwork scale around the input dials, eliminating the viewing from a distance problem associated with printed artwork scales on pot dials.

The present invention also reduces the expense associated with pots. Contacting encoders are less expensive than pots of required quality to obtain the same performance. The reason contacting encoders are acceptable is due to the increase/decrease method of operation. The quadrature count can actually "skip a beat" without notice to the user. Because of the purely relative nature of the process, no absolute position count is required. It is to be noted that optical design (higher quality) encoders, pots without a mechanical stop, or variable pressure sensitive devices could be used without avoiding the spirit of the invention.

With respect to expense, it should also be noted that the decode/latch circuitry is also less expensive than the A/D (analog-to-digital) conversion channel and/or multiplexer circuitry required with pots.

Turning back briefly to FIG. 3, it should be noted that the software provides automatic increment amount conversion depending on the state of the balancer. For instance, as the diameter input knob increases the displayed value, certain non-standard or unlikely values can simply be skipped. (Such values are simply not present in the look-up table.) This depends on prior knowledge of the range of possible diameter/widths of likely rims to be used on the machine, stored in the program. For example, if "inches" is the selected units via other inputs 27, then the display will automatically skip over non-standard input values. Diameters of rims might default to increment or decrement by 0.5" (since a 13.25" diameter wheel, for example, is highly unlikely). Width input might default to 0.25". The reference distance would not have an increment default. Of course, a very slow turning of the knob still lets the user fine tune the value to something in between the default increment value. This saves the user a great deal of time, since no input time is wasted passing through non-standard values.

Figure 5:
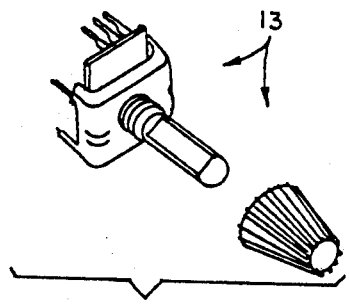
FIG. 5 is a perspective of a digital contacting rotary encoder used as an input device in one embodiment of the present invention.

Turning to FIGS. 5-9, there are shown several alternative input devices. FIG. 5 illustrates the contacting digital quadrature rotary encoder discussed above. FIGS. 6, 7, 8 and 9 illustrate four variable pressure sensitive alternatives which could be used with similar instantaneous software controlled "feel."

Figure 6:
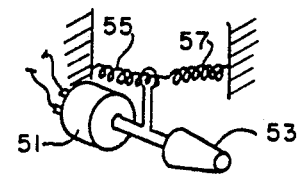
FIG. 6 is a perspective of a spring-biased potentiometer used as an input device in another embodiment of the present invention.

FIG. 6 shows a pot 51 with a knob 53 configured as a relative or relational input device. The input shaft of the pot is held by a pair of springs 55, 57 in a neutral position. The computer is programmed to increment the associated display by greater amounts, the harder the knob 53 of the pot is turned. The resistance of springs 55 and 57 to rotation increases with additional rotation of the knob. With this particular construction, the greater the pressure applied by the user to the knob in rotating it, the greater the increment of display change. This construction avoids the problem of the "dead spot" in the pot, but it does require an A/D conversion channel. This construction, with the same sampling method described above, can sense the relative position change of the knob, with the same results and "feel" as described above.

Figure 7:
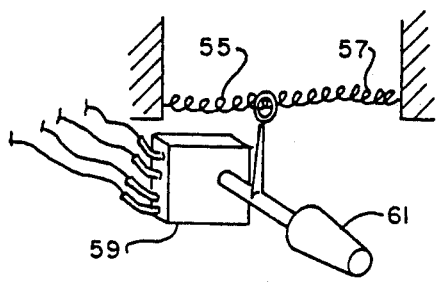
FIG. 7 is a perspective of a spring-biased, multi-pole switch (or stepped attenuator) used as an input device in a third embodiment of the present invention.

FIG. 7 illustrates a similar variable pressure responsive device—in this case a multipole switch 59 with a knob 61. This device requires no A/D conversion. With switch 59 as the input device, computer 23 changes the displayed value by increments which are determined by the particular switch pole which is closed at that particular time. Of course, other devices such as stepped attenuators could also be used as input devices with the same effect.

Figure 8:
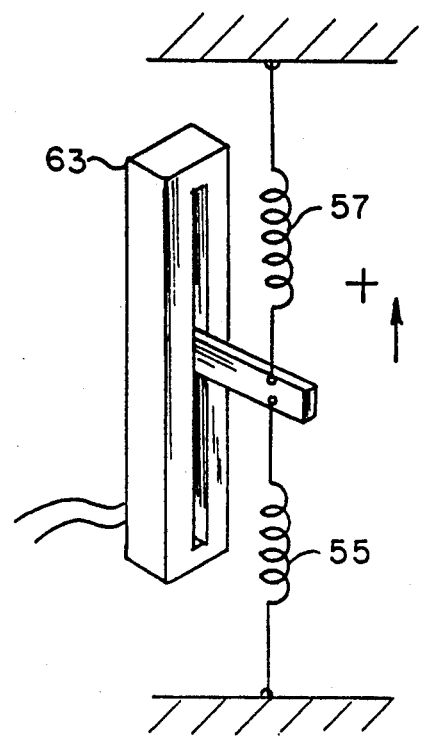
FIG. 8 is a perspective of a spring-biased slide potentiometer used as an input device in a fourth embodiment of the present invention.
Figure 9:
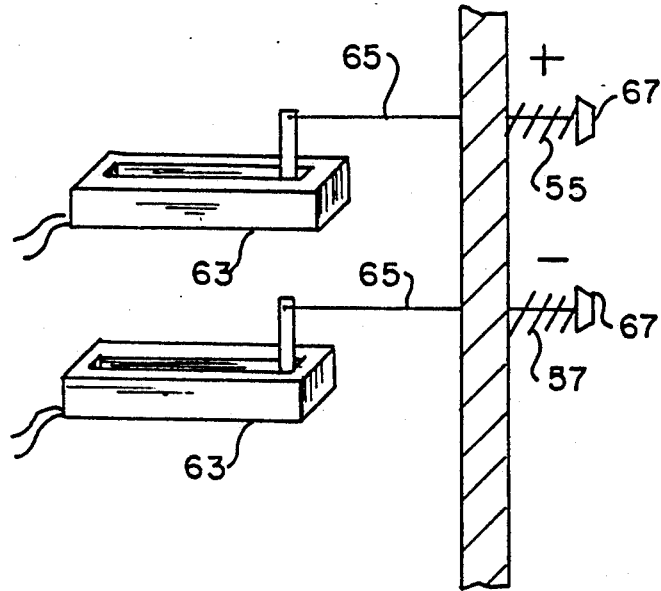
FIG. 9 is a perspective of a fifth embodiment of the present invention having a pair of spring-biased pushbuttons connected to a pair of slide potentiometers as the input device.

FIGS. 8 and 9 illustrate two other variable pressure input devices. In FIG. 8, a single slide potentiometers 63 has its actuator biassed to a neutral or central position by springs 55 and 57. Movement in either the "increase" or the "decrease" direction is increasingly opposed by the respective springs as the distance from the neutral position increases.

In FIG. 9, two slide potentiometers, each biassed to a predetermined position, by springs 55 and 57 respectively, are activated by push bars 65 connected to suitable push-buttons 67. The top push button, for example, is used to increase the displayed value, while the bottom one is used to decrease that value. Both push-buttons, of course, may be used with the software described above to input relative (rate of change) information to the computer to change the appropriate display.

In the embodiments of FIGS. 8 and 9, although the actuating movement is linear instead of rotary, the same variable "feel" with relative actuator position is achieved as with the rotary devices of FIGS. 6 and 7.

In view of the above it will be seen that the various objects and features of the invention are achieved and other advantageous results are obtained. The embodiments disclosed herein are illustrative only and are not intended in a limiting sense.

What is claimed is:

1. An automotive test equipment parameter input system comprising:
   display means for visually displaying a potential value of a parameter for automotive test equipment;
   manually operable rotary input means operable by a user for providing, by rotation of said input means, an indication that a change in the displayed value is desired by the user; and
   electronic means, connected to the display means and responsive to the indication from the input means that a change is desired, for controlling the display means to change the potential value of the parameter displayed by the display means in accordance with the rotation of the rotary input means;
   wherein the manually operable rotary input means is operable by the user applying variable pressure thereto, said input means providing a variable signal to the electronic means, said variable signal varying in accordance with the amount of pressure applied by the user, said electronic means controlling the display means to change the displayed value at a rate corresponding to the pressure applied by the user to the manually operable rotary input means.

2. An automotive test equipment input system comprising:
- display means for visually displaying a potential value of an input to automotive test equipment;
- manually operable input means operable by a user applying variable pressure thereto for providing a variable signal indicating that a change in the displayed value is desired by the user, said variable signal varying in accordance with the amount of variable pressure applied by the user; and
- electronic means connected to the display means and responsive to the variable signal from the manually operable input means for controlling the display means to change the potential value of the input displayed by the display means at a rate corresponding to the variable pressure applied by the user to the manually operable input means.

3. The automotive test equipment input system as set forth in claim 2 wherein the variable signal from the input means provides relative position information only.

4. The automotive test equipment input system as set forth in claim 2 wherein there are a plurality of parameters to be inputted to the system and wherein the display means includes a separate display for each parameter to be inputted.

5. The automotive test equipment input system as set forth in claim 2 wherein the visual display includes at least one digital numeric display.

6. The automotive test equipment input system as set forth in claim 2 wherein the electronic means includes means for storing a likely input value, said electronic means controlling the display means to display said likely input value as the displayed potential input value prior to an indication from the input means that a change in the displayed value is desired.

7. The automotive test equipment input system as set forth in claim 2 further including automatic input means for automatically supplying input information to the electronic means independent of the absolute position of the manually operable input means.

8. The automotive test equipment input system as set forth in claim 2 wherein the input means is actuated by a rotary motion, said input means having an output signal which provides at least rotation direction information to the electronic means.

9. The automotive test equipment input system as set forth in claim 8 wherein the rotary input means output signal also provides rotation rate information to the electronic means.

10. The automotive test equipment input system as set forth in claim 9 wherein the electronic means includes means for storing a potential input value if that value meets at least some predetermined stability criteria, said electronic means being responsive to rotation of the rotary input means at a rate above a predetermined input rate to display the stored potential input value instead of changing the displayed value.

11. The automotive test equipment input system as set forth in claim 10 wherein one of the predetermined stability criteria is the display of a potential value for a time greater than a predetermined time.

12. The automotive test equipment input system as set forth in claim 2 wherein the electronic means includes means for skipping the display of certain predetermined input values as a change in the displayed value is requested.

13. The automotive test equipment input system as set forth in claim 2 wherein the input means is actuated by a linear motion, said input means having an output signal which provides at least actuation direction information to the electronic means.

14. The automotive test equipment input system as set forth in claim 13 wherein the linear input means output signal also provides actuation rate information to the electronic means.

15. The automotive test equipment input system as set forth in claim 14 wherein the electronic means includes means for storing a potential input value if that value meets at least some predetermined stability criteria, said electronic means being responsive to actuation of the linear input means at a rate above a predetermined input rate to display the stored potential input value instead of changing the displayed value.

16. The automotive test equipment input system as set forth in claim 15 wherein one of the predetermined stability criteria is the display of a potential value for a time greater than a predetermined time.

* * * * *